United States Patent [19]
Grabow

[11] Patent Number: 5,790,052
[45] Date of Patent: Aug. 4, 1998

[54] METHOD FOR DETERMINING THE POSITION OF A VEHICLE ON A ROAD

[75] Inventor: Wilhelm Grabow, Hildesheim, Germany

[73] Assignee: Robert Bosch GmbH, Stuttgart, Germany

[21] Appl. No.: 836,342

[22] PCT Filed: Oct. 13, 1995

[86] PCT No.: PCT/DE95/01408

§ 371 Date: Jul. 21, 1997

§ 102(e) Date: Jul. 21, 1997

[87] PCT Pub. No.: WO96/14626

PCT Pub. Date: May 17, 1996

[30] Foreign Application Priority Data

Nov. 5, 1994 [DE] Germany ............... 44 39 708.9

[51] Int. Cl.$^6$ .............................................. G06G 1/00
[52] U.S. Cl. ........................ 340/928; 340/933; 340/937; 340/907; 342/42; 342/44; 342/70; 342/442; 235/384
[58] Field of Search ........................ 340/928, 825.31, 340/933, 937, 907, 901, 903; 342/442, 51, 156, 456, 42, 46, 44, 70, 417; 235/384

[56] References Cited

U.S. PATENT DOCUMENTS 5,227,803  7/1993  O'Connor et al. ................. 342/442
5,592,181  1/1997  Cai et al. ........................... 342/457
5,710,556  1/1998  Nishimura et al. .................. 340/928

FOREIGN PATENT DOCUMENTS 41 07 803 A1  9/1992  Germany.

OTHER PUBLICATIONS

European Microwave Conference 1993, Madrid, pp. 351–353.

Primary Examiner—Jeffery A. Hofsass
Assistant Examiner—Benjamin C. Lee
Attorney, Agent, or Firm—Kenyon & Kenyon

[57] ABSTRACT

According to the present invention, a method is proposed for determining the position of a vehicle, in which the vehicle performs a data transmission in the short-range field of at least one beacon. By means of data transmission with at least two or three beacons, an assignment of data transmission and vehicle position within a communications zone can be made. Relative velocities of the vehicle are determined from the data transmission signals sent by the vehicle and received by the beacons, in each instance. The lane or the position of the vehicle sending the data is determined from the velocity ratio or from several velocity ratios. A preferred use is intended to be electronic collection of road use fees or checking of road access entitlement.

12 Claims, 2 Drawing Sheets

METHOD FOR DETERMINING THE POSITION OF A VEHICLE ON A ROAD

FIELD OF THE INVENTION

The present invention relates to a method for determining the position of a vehicle, which is located on a road, in the short-range transmitting/receiving field of a first beacon, and performs data transmission with its on-board unit.

BACKGROUND INFORMATION

Within the scope of comprehensive traffic management, there will be many new services, in the future, in which the position of the vehicle which is performing a data transmission at a particular time must be determined. In particular when fee services are involved, e.g. automatic electronic collection of road use fees, or when checking for entitlement to use a certain lane, it must be ensured that even if several vehicles are in the transmitting/receiving range of a beacon, the current data transmission is assigned only to a single vehicle, in a targeted manner. From the publication "Microstrip array antenna for an automatic road pricing system," European Microwave Conference 1993, Madrid, pages 351 to 353, it is already known to form communications zones in a lane, by means of several antennas, which zones are so narrow that only a single vehicle can be located within a communications zone at one time. In this connection, for example, several fixed antennas per vehicle are provided, to produce several narrow communications zones. In accordance with German Patent Application No. OS 42 22 014, an antenna arrangement is provided on the beacon, which arrangement electronically generates a follow-up, a direction diagram for a certain vehicle, in such a way that a main receiving beam is aimed at the vehicle in question, and the reception attenuation relative to the main receiving beam is high in the direction of the other adjacent objects in each instance.

The technical effort involved in these solutions is relatively great. Another problem also results from the fact that larger communications zones, in which several vehicles can be located, are not possible. However, it is desirable to transmit certain free-of-charge information and warning services to as many vehicles as possible, for example if a traffic jam threatens to occur due to an accident, or if the weather is causing problems. Furthermore, in a large communications zone, more time is available for data transmission, so that even vehicles which are driving very fast can be reliably included.

SUMMARY OF THE INVENTION

The method according to the present invention, for determining the position of a vehicle, has the advantage, in comparison, that the proposed solution represents a simple method for clear assignment of a vehicle position and a data transmission, using the velocity measurement. It is particularly advantageous that the method does not set any special requirements or changes with regard to carrier frequency, band width, modulation or transmission of special data sequences. It is therefore fundamentally compatible with the future standard of short-range data transmission at 5.8 GHz for traffic applications.

By simultaneously measuring the velocity, using the two beacons, the following result is achieved in advantageous manner: a vehicle position can be determined by forming the ratio of every data transmission to the beacons, and this position has a certain direction relative to the two beacons.

It is furthermore advantageous that the start of the velocity measurement can be triggered, for example, by means of an induction loop or an infrared photoeye in the road, since these devices are essentially independent of weather and can easily be installed in the road surface or above the traffic lane.

If, on the other hand, a precise determination of position is required, a third velocity can be measured, using a third beacon, and the exact vehicle position can be determined by means of a comparison equation, since the distance from the three beacons has been established.

For practical purposes, an arrangement to the right and left of a roadway and above a road appears to be particularly suitable, since this arrangement can be directed at the same communications zone.

For monitoring purposes, it is advantageous to repeat the velocity measurement at specific intervals.

Using the position determination, a data transmission received at beacons can be assigned to a single vehicle, even if there are other vehicles in the communications zone. This is particularly important for fee services such as electronic collection of road use fees, or for checking vehicle entitlement to use a lane. On the other hand, non-fee services can be exchanged with all the vehicles, in simple manner.

If an abuse or violation of the services is detected, proof can also be obtained in simple manner, e.g. by photographing the vehicle.

DETAILED DESCRIPTION OF THE INVENTION

Figure 1:
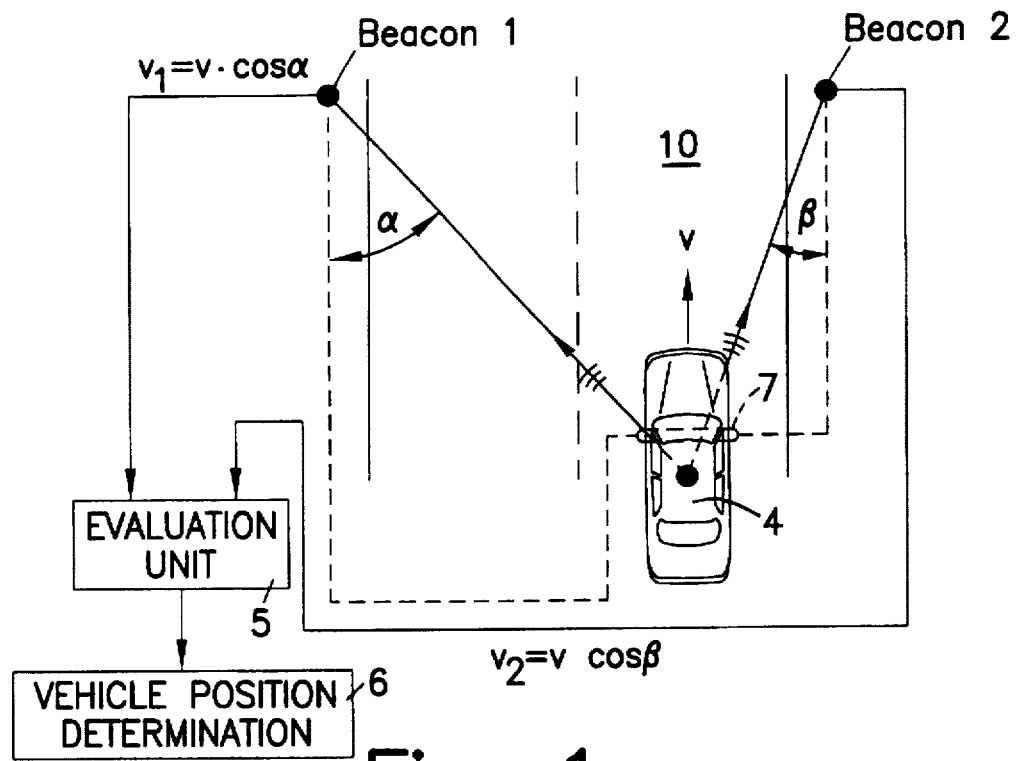
FIG. 1 shows a first exemplary embodiment of the present invention.

FIG. 1 shows a part of a road 10 with two lanes, where a vehicle 4 is moving in the direction of a beacon 1 and 2, respectively, in the right lane. The vehicle 4 is traveling at a velocity v and has an on-board unit (OBU) with which it performs data transmission between the beacons 1, 2, in the microwave frequency range, preferably at 5.8 GHz, for example according to the transponder method. The beacons 1, 2 have corresponding transmitters with one or two antennas; which cover part of the road 10 as a communications zone. In this connection, their transmission frequencies can be adjusted in accordance with German Patent Application No. OS 42 13 880. Such a transmitting/receiving device is known, for example, from German Patent Application No. 41 07 803 A1, and therefore does not need to be explained in greater detail. Optionally, an electromagnetic or optical transmitter 7 is placed in the road surface as an induction loop, or arranged above the road or at the edge of the road as an infrared photoeye, and this transmitter sends a signal to beacons 1 and 2 to start the data transmission or velocity measurement, if it is triggered by a vehicle. Beacons 1, 2 are preferably arranged on the right and the left of the road 10, and form an angle $\alpha$ or $\beta$, respectively, relative to the vehicle for a certain vehicle position. Since beacons 1, 2 are arranged symmetrical to the center of the road, the relative speed is $v_1 = v * \cos \alpha$ relative to beacon 1, and $v_2 = v * \cos \beta$ relative to beacon 2. Beacons 1, 2 pass the two velocity signals $v_1$, $v_2$ on to an evaluation unit 5, which determines the vehicle position 6 from them.

Figure 2:
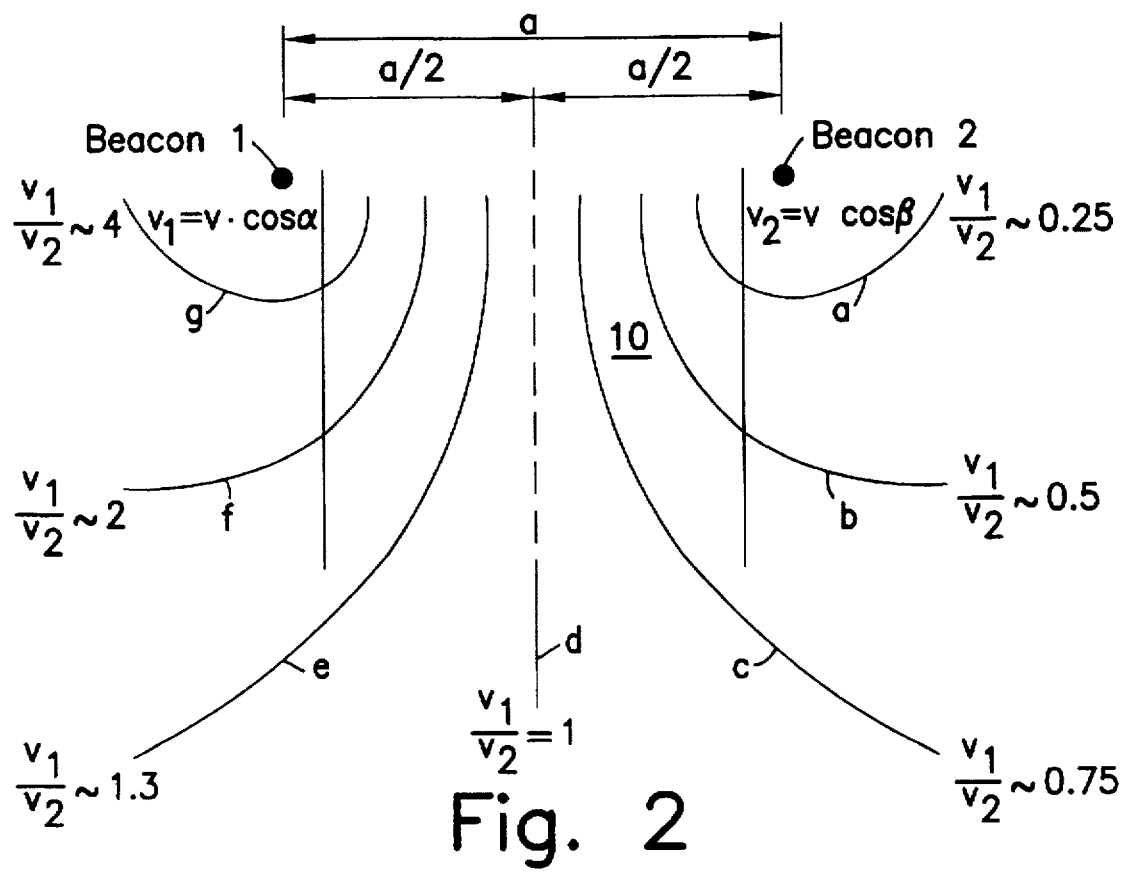
FIG. 2 shows diagram curves according to the present invention.

Using FIG. 2, the determination of position will be explained in greater detail. In FIG. 2, lines with the same velocity ratio $v_1/v_2$ (velocity profiles) are plotted. Beacons 1, 2 are set up on the right and the left, symmetrical to the center of the roadway, along the road 10, as in FIG. 1. They are at a distance a from each other, so that they are each at a distance a/2 from the center of the roadway. If a vehicle were to drive along the center line of the road 10, the velocity measured by beacons 1, 2 would be the same at all times, i.e. the ratio $V_1/V_2=1$. If, however, the vehicle is driving more on the right side of the road 10, as in FIG. 1, the relative velocity at beacon 1 is less than that relative to beacon 2. This is expressed by the curves a, b, and c. In the examples, it was assumed, for the sake of simplicity, that the beacons and the on-board unit are at the same level above the road. For curve a, the velocity ratio $v_1/v_2=0.25$, for curve b the ratio $v_1/v_2=0.5$, and for curve c the ratio $v_1/v_2=0.75$. However, if the vehicle comes closer to beacon 1, in the left lane, the velocity measured by beacon 1 is greater than the velocity measured by beacon 2, since beacon 2 is farther away from the vehicle than beacon 1. Accordingly, the velocity ratio for the curve e is $v_1/v_2=1.3$, for curve f the ratio is $v_1/v_2=2$, and for curve g the ratio is $v_1/v_2=4$. For curve d, the center line, the ratio of $v_1/v_2=1$.

An exact determination of position of the vehicle is not possible with two beacons. Using the ratios $$\frac{v_1}{v_2} = \frac{\cos\alpha}{\cos\beta}$$

the lines for any possible vehicle position can be determined. Once such a vehicle position has been determined, this velocity ratio can be assigned to a recognition code, which is combined with the data transmission between a beacon and the vehicle, for example for targeted transmission of fee services, electronic collection of road use fees, checking road access entitlement, etc. Using the recognition code, only a single vehicle is addressed, since every other vehicle in the communications zone has a different velocity ratio and therefore also gets a different recognition code. To check this, the velocity measurement can be repeated, for example at every data transmission. Since the velocity ratios run approximately parallel to the vehicle's direction of travel the closer the vehicle comes to the region of the beacons, a definite recognition code for a specific vehicle is therefore obtained. In particular, there is also a clearly different velocity ratio between two vehicles traveling parallel to one another or approaching each other in adjacent lanes, since the velocity ratio in the right lane is always less than 1 and that in the left lane is always greater than 1.

Figure 3:
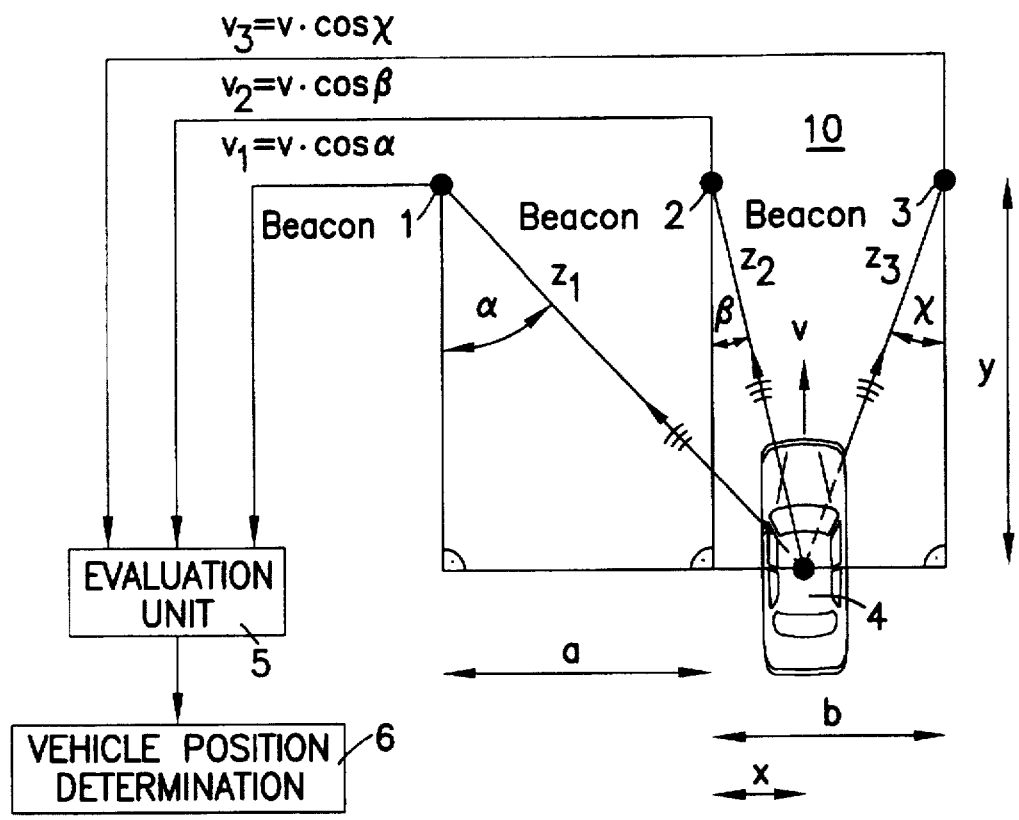
FIG. 3 shows a second exemplary embodiment of the present invention.

A precise determination of location is possible, according to FIG. 2, for a second exemplary embodiment, in which three beacons 1, 2, and 3 are used. The arrangement of beacons 1, 3 takes place as in the first exemplary embodiment according to FIG. 1. A third beacon can be arranged above the roadway, for example above the center line of the road 10. In accordance with FIG. 3, the vehicle forms a driving angle $\alpha$, $\beta$, $\chi$. The velocity ratio between the first and second beacon 1, 2 is determined by the following equation:

$$\frac{v_1}{v_2} = \frac{\cos\alpha}{\cos\beta} \quad \text{(Equation 1)}$$

Between beacons 2 and 3, the velocity ratio is $$\frac{v_1}{v_2} = \frac{\cos\beta}{\cos\chi} \quad \text{(Equation 2)}$$

With $\cos\alpha = \frac{y}{z_1}$ ; $z_1 = \sqrt{y^2 + (a+x)^2}$ this results in $$\cos\alpha = \frac{y}{\sqrt{y^2 + (a+x)^2}} \quad \text{(Equation 3)}$$

Analogously, the following applies:

$\cos\beta = \frac{y}{z_2}$ ; $z_2 = \sqrt{y^2 + x^2}$

This results in $$\cos\beta = \frac{y}{\sqrt{y^2 + x^2}} \quad \text{(Equation 4)}$$

and with $\cos\chi = \frac{y}{z_3}$ ; $z_3 = \sqrt{y^2 + (b-x)^2}$ this results in $$\cos\chi = \frac{y}{\sqrt{y^2 + (b-x)^2}} \quad \text{(Equation 5)}$$

$z_1$, $z_2$, $z_3$ are the distances between the vehicle and beacons 1, 2, 3 in each instance. From the five equations with the five unknowns $\alpha$, $\beta$, $\chi$, x, y, and the known variables $v_1$, $V_2$, $V_3$, a, b, the coordinates for the vehicle position x, y can be calculated in accordance with FIG. 3. The individual parameters a, b, x, y, $z_1$, $z_2$, $z_3$, $\alpha$, $\beta$, $\chi$ can be found in FIG. 3. For example, the evaluation unit 5 can be a microcomputer with a corresponding program, which is used to calculate the vehicle position x, y in accordance with the equations given.

Figure 4:
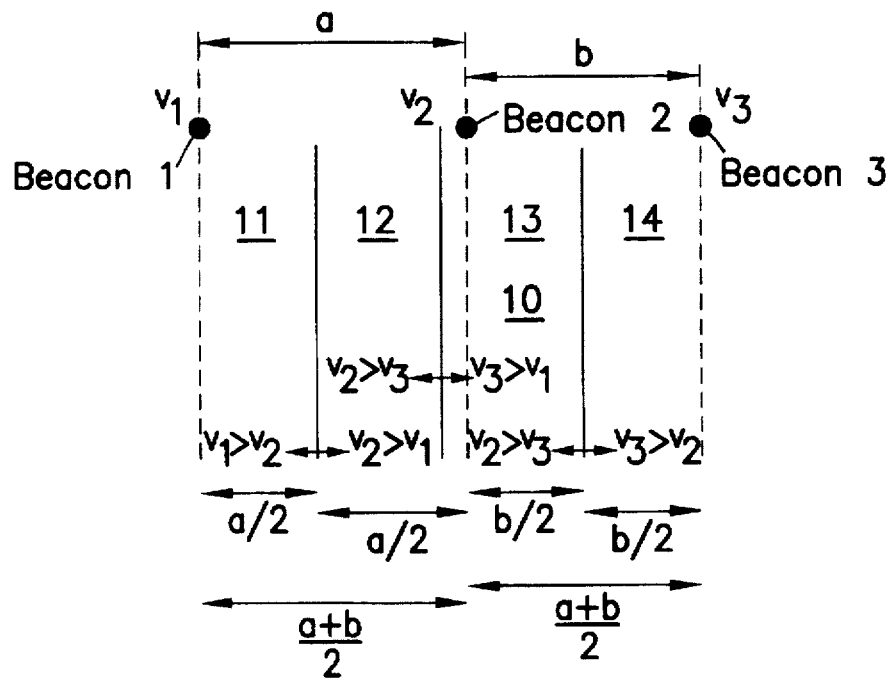
FIG. 4 shows other examples of the position of a vehicle.

To illustrate these interconnections, FIG. 4 shows various parts of the road 10 with the beacons 1, 2, 3, and with the vehicle velocities $v_1$, $V_2$, $V_3$ measured by the beacons. If, for example, the vehicle is located in lane 11, then the measured velocity $v_1$ relative to beacon 1 is greater than the velocity $v_2$ relative to beacon 2. If, on the other hand, the vehicle is located in lane 12, then the velocity $v_2$ relative to beacon 2 is greater than the velocity $v_1$ relative to beacon 1. Analogous conditions exist in lanes 13 and 14 when the vehicle is approaching beacons 2 and 3. In lane 13, the velocity relative to beacon 2 is greater than that relative to beacon 3, and analogously, in lane 14, the velocity relative to beacon 3 is greater than that relative to beacon 2. Furthermore, the velocity $V_3$ in lanes 13, 14 relative to beacon 3 is greater than the velocity $v_1$ relative to beacon 1. On the other hand, in lanes 11, 12, the velocity $v_1$ relative to beacon 1 is greater than the velocity $V_3$ relative to beacon 3. This is evident from the symmetry conditions in FIG. 4. Using this representation, ranges for the vehicle positions can be determined even without calculating them from the measured velocity values. If the on-board unit is communicating with more than three beacons, the accuracy of the position determination can be improved, i.e. measurement errors can be compensated.

Using these determinations of position, fee services such as electronic collection of road use fees, or checking access entitlement for certain lanes, for example those reserved for buses, police or fire department vehicles, can be checked and monitored. If a violation is found, the vehicle can be automatically photographed using a subsequent photography system.

What is claimed is:

1. A method for determining the position of a vehicle, comprising the steps of:

transmitting a data signal from an on-board unit (OBU) of the vehicle to a first beacon, the vehicle being in a first communications zone of a short-range transmitting/receiving field of the first beacon;

determining a first velocity of the vehicle relative to the first beacon as a function of the transmitted data signal;

arranging at least one second beacon in a region of the vehicle, the at least one second beacon being separate from the first beacon and having a second communications zone of a short-range transmitting/receiving field which at least one second beacon and the vehicle at least partially superimposes the first communications zone;

determining a second velocity of the vehicle relative to the at least one second beacon as a function of the transmitted data signal;

determining a position of the vehicle as a function of a ratio of the first velocity and the second velocity; and targeting data transmission to the vehicle in the determined position.

2. The method according to claim 1, wherein the steps of determining the first velocity and the second velocity are triggered by the vehicle at the same time.

3. The method according to claim 1, further comprising the step of:

determining the first velocity and the second velocity at each transmission of the data signal from the vehicle to the first beacon and the at least one second beacon.

4. The method according to claim 1, further comprising the step of:

starting the steps of determining the first velocity and the second velocity measurements when triggered by one of an electromagnetic transmitter and optical transmitter.

5. The method according to claim 1, further comprising the steps of:

arranging a third beacon separately from the first beacon and the at least one second beacon so that the transmission of the data signal takes place at the same time between the vehicle and the first beacon, the at least one second beacon and the third beacon;

determining a third velocity of the vehicle relative to the third beacon as a function of the transmitted data signal.

6. The method according to claim 5, further comprising the step of:

repeating the steps of determining the first, second and third velocities at a predetermined interval.

7. The method according to claim 5, further comprising the step of:

arranging, symmetrical to a center of a road, the first beacon, the at least one second beacon, and the third beacon so that each beacon is aimed at a lane of the road, wherein the first beacon is on the right of the lane, the at least one second beacon is on the left of the lane, and the third beacon is above the lane.

8. The method according to claim 5, further comprising the step of:

carrying out the targeted data transmission as a function of the first, second and third velocities.

9. The method according to claim 8, further comprising the step of:

using the targeted data transmission for predetermined services.

10. The method according to claim 9, wherein the predetermined services include one of electronic fee collection, vehicle speed checking and road use entitlement checking.

11. The method according to claim 9, wherein when a violation of the predetermined services occurs, a measure for obtaining proof is implemented.

12. The method according to claim 11, wherein the measure for obtaining proof includes a photographing of the vehicle.

* * * * *